US012811056B2

(12) United States Patent
Azevedo de Souza e Vecchia et al.

(10) Patent No.: US 12,811,056 B2
(45) Date of Patent: Nov. 24, 2026

(54) INTEGRATED AUTO-TRANSFORMER BASED ZERO OR 180 DEGREES PHASE SHIFTER

(71) Applicant: NXP B.V., Eindhoven (NL)

(72) Inventors: Vinicius Azevedo de Souza e Vecchia, Caen (FR); Stephane David, Sainte-croix Grand Tonne (FR); Olivier Tesson, Bretteville l'Orgueilleuse (FR)

(73) Assignee: NXP B.V., Eindhoven (NL)

( * ) Notice: Subject to any disclaimer, the term of this patent is extended or adjusted under 35 U.S.C. 154(b) by 616 days.

(21) Appl. No.: 18/476,360

(22) Filed: Sep. 28, 2023

(65) Prior Publication Data

US 2024/0120148 A1 Apr. 11, 2024

(30) Foreign Application Priority Data

Oct. 5, 2022 (EP) .................................... 22306486

(51) Int. Cl.
*H01F 30/02* (2006.01)

(52) U.S. Cl.
CPC .................................. *H01F 30/02* (2013.01)

(58) Field of Classification Search
CPC ...................................................... H01F 30/02
See application file for complete search history.

(56) References Cited

U.S. PATENT DOCUMENTS 5,187,654 A * 2/1993 Felippe .................. H02M 5/32 363/153
5,801,610 A * 9/1998 Levin ..................... H01F 30/12 336/12
7,561,007 B1 * 7/2009 Heissler .................. H01P 1/184 333/139
10,348,265 B2 7/2019 Ishizuka et al.
2010/0167667 A1 * 7/2010 Laporte ................... H01F 21/12 333/25
2013/0157587 A1 * 6/2013 Blanchet ................. H01F 21/12 336/200
2014/0077894 A1 * 3/2014 Bulja ........................ H01P 1/18 333/119

(Continued)

FOREIGN PATENT DOCUMENTS

KR 101390701 B1 * 5/2014 ................ H01P 5/10

OTHER PUBLICATIONS

European Patent Office—Communication about intention to grant a European patent 2026 (Year: 2026).*

(Continued)

*Primary Examiner* — Malcolm Barnes

(57) ABSTRACT

There is provided a phase shifting device and method of manufacturing the same. The device comprises an auto-transformer comprising a primary winding configured to receive an input signal; and two secondary windings, wherein a first one of the two secondary windings is in phase with the primary winding and a second one of the two secondary windings is out of phase with the primary winding. The device also comprises a first switch coupled to an output signal of the first one of the two secondary windings of the auto-transformer; and a second switch coupled to an output signal of the second one of the two secondary windings of the auto-transformer. Output signals of the first and second switches are couplable to an output of the phase shifting device.

19 Claims, 9 Drawing Sheets

(56) References Cited

U.S. PATENT DOCUMENTS

| | | | | |
|---|---|---|---|---|
| 2017/0353056 | A1* | 12/2017 | Kawai | H01P 5/18 |
| 2021/0304958 | A1* | 9/2021 | Yu | B60L 53/11 |
| 2022/0131530 | A1 | 4/2022 | Johnson et al. | |

OTHER PUBLICATIONS

Amirkhanzadeh et al: "L-Band 180° Passive Phase Shifter Employing Auto-Transformer in an SOS Process", 2014 IEEE International Symposium on Circuits and Systems (ISCAS), Jun. 1-5, 2014, 4 pages.

* cited by examiner

INTEGRATED AUTO-TRANSFORMER BASED ZERO OR 180 DEGREES PHASE SHIFTER

CROSS-REFERENCE TO RELATED APPLICATIONS

This application claims priority under 35 U.S.C. § 119 to European patent application no. 22306486.6, filed 5 Oct. 2022, the contents of which are incorporated by reference herein.

FIELD

The present disclosure relates to a phase shifting device and a method of manufacturing a phase shifting device.

BACKGROUND

It is generally required for phase shifters to have a 360 degree phase coverage in beam forming applications. Passive phase shifters are often employed since they are bidirectional meaning that only one phase shifter is needed for an Rx/Tx path. In addition, passive phase shifters generally have good linearity. It is often more convenient to design several passives phase shifters in series to achieve a desired phase shift. For example, six stages may be used to cover a full 360 degree range including one 0 or 180 degrees phase shifter. A zero or 180 degree phase shifting device as will be described herein.

A previous auto-transformer phase shifter is described in "L-band 180 degrees passive phase shifter employing auto-transformer in an SOS process" by R. Amirkhanzadeh et al. This on-chip design comprise shifting the phase by 180 degrees using a single auto-transformer, and achieving a zero degrees phase shift derived directly from the input signal path (i.e. a through connection). This results in the path length of the phase shifter at zero degrees being significantly different to the path length when the signal is phase shifted by 180 degrees. This difference in path length results in S parameters (S11, S22, S21) of the device being significantly different between the two-phase settings. This design results in difficulties to reach all desired performance specifications for an auto-transformer phase shifter.

On-chip transformers can be planar or stacked structures. Stacked structures provide a high coupling coefficient with small size, where small size is a desirable quality in many applications. Stacked structures comprise metal layers stacked on top of one another.

SUMMARY

According to a first aspect, there is provided a phase shifting device. The device comprising an auto-transformer comprising a primary winding configured to receive an input signal; and two secondary windings, wherein a first one of the two secondary windings is wound such that an output signal of the first secondary winding is in phase with the input signal of the primary winding and a second one of the two secondary windings is wound such that an output signal of the second secondary winding is out of phase with the input signal of the primary winding. The device also comprising a first switch coupled to an output signal of the first one of the two secondary windings of the auto-transformer; and a second switch coupled to an output signal of the second one of the two secondary windings of the auto-transformer. Output signals of the first and second switches are couplable to an output of the phase shifting device. The switches may be radiofrequency, RF, switches.

An input signal travels through the primary winding of the transformer, then through either of the two secondary signals to an output of the device, depending on which of the two switches is closed. A phase shift of a first signal which travels through the first one of the two secondary windings may be zero degrees relative to the input signal, and a phase shift of a second signal which travels through the second one of the secondary windings may be 180 degrees relative to the input signal.

In some embodiments, a first path length of a first signal received at the primary winding and output via the first one of the two secondary windings may be equal to a second path length of a second signal received at the primary winding and output via the second one of the two secondary windings. Having the same path length has benefits for applications of the phase shifting device.

In some embodiments, one of the first switch and the second switch may be closed at a given time.

In some embodiments, the first and second switches may form a series switch.

In some embodiments, the device optionally further comprises a second auto-transformer in connection with the output signals of the two secondary windings of the first auto-transformer.

In some embodiments, the second auto-transformer comprises: two primary windings having as input the respective outputs of the two secondary windings of the first auto-transformer; and optionally, a secondary winding couplable to the output of the phase shifting device.

In some embodiments, the switches may form a shunt switch. This may be connected to ground.

In some embodiments, the secondary winding of the second auto-transformer is wound such that an output signal of the secondary winding is in phase with an input signal of either one of the two primary windings of the second auto-transformer. The second-auto-transformer will not act to shift the phase of the signal through, rather balancing the signal from the first auto-transformer.

According to a second aspect, there is provided a method of manufacturing a phase shifting device using a metallization process, wherein layers of the metallization process are parallel to one another. The method may comprise depositing a primary winding in a first layer, the primary winding configured to receive an input signal. The method may further comprise depositing two secondary windings and two switch connections coupled to the two secondary windings in a second layer. Optionally, wherein output signals of the first and second switches are couplable to an output of the phase-shifting device. The method may further comprise coupling the primary winding to the secondary windings. For example, the primary and secondary windings may be couplable at a common port using a via which electrically connects the first and second layers of the metallization process.

In some embodiments, the primary and secondary windings may each be configured as a ring. The rings may be of different sizes.

In some embodiments, a first one of the secondary windings may be positioned within a second one of the secondary windings. For example, the secondary windings may be concentric rings. Optionally, the first one of the secondary windings may have narrower walls than the second one of the secondary windings. In some examples, the cross-sectional area of the inner winding may be less than the cross-sectional area of the outer winding.

In some embodiments, a first one of the secondary windings may be positioned opposite a second one of the secondary windings. The secondary windings may be a mirror image of one-another. They may be connected at a central point, the central point being a common node which also connects to the primary winding.

Optionally, the method may further comprise manufacturing a second auto-transformer. The second auto-transformer may comprise depositing a pair of primary windings in the second layer; depositing a second secondary winding in the first layer; and coupling the second auto-transformer to the first auto-transformer.

In some embodiments, the pair of primary windings and the second secondary windings of the second auto-transformer may be linear.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

A phase shifting device having an auto-transformer with one primary and two secondary windings is herein described. The phase shifter is arranged to shift the phase of a signal, preferably an RF signal, by zero and 180 degrees as required. The auto-transformer comprising two secondaries enables the design of a zero or 180 degrees phase-shifter with minimal S parameter variation between phase settings. Results shows that the device as described herein presents low insertion loss (2.4 dB at 28 GHz) while having a straightforward design, making it easy to manufacture.

An advantage of the present disclosure is that a symmetry of the device is provided such that the RF signal path does not change between the signal being shifted by zero or 180 degrees. The phase shifter topology makes it possible to design a passive, zero-or-180-degrees, auto-transformer based phase shifter with close to zero phase to gain variation. This means that for the centre frequency, the gain (or insertion loss) of the phase shifter will not change when the phase is changed from zero to 180 degrees, which is a highly desired feature in a phase shifter. Furthermore, the reflection coefficient for the input and output ports of the phase shifter does not change in a significant way when the phase changes. All this is achieved in a straightforward manner with simple design constrains.

Figure 1:
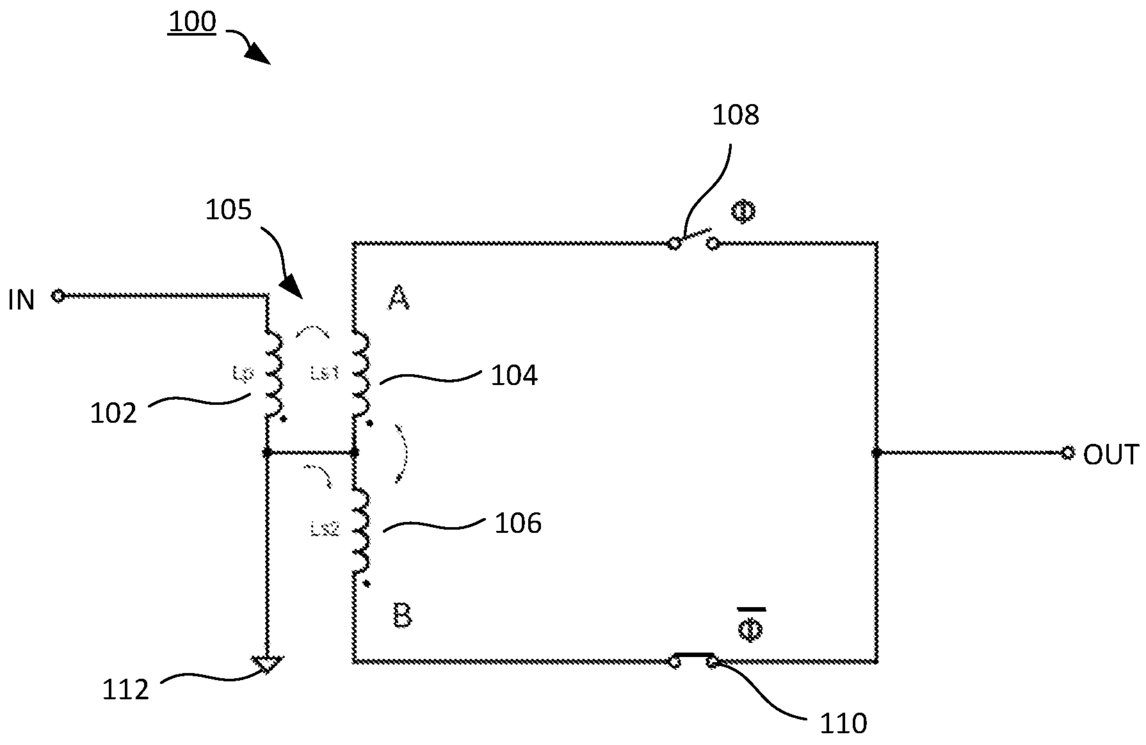
FIG. 1 illustrates a circuit diagram of an auto-transformer phase shifter comprising a first auto-transformer having one input and two outputs according to an embodiment of the disclosure.

FIG. 1 illustrates a circuit diagram of a first embodiment of an auto-transformer phase shifter 100 comprising a first auto-transformer 105 having one input and two outputs. The first embodiment may be compatible with a MOS switch, for example.

The phase shifter device 100 comprises an auto-transformer 105 and two switches 108, 110. The switches are preferably radiofrequency (RF) switches.

The auto-transformer 105 comprises a primary winding 102 and two secondary windings 104, 106. An input signal is connected to the primary winding (e.g. primary coil) 102 and is output via one of the two secondary windings (e.g. secondary coils) 104, 106. The primary winding 102 is also connected to ground 112. Each secondary winding output is connected to a radiofrequency, RF, switch 108, 110. The phase difference between each secondary winding output is 180 degrees.

The RF switches 108, 110 are controlled to select either one of the secondary windings 104, 106 of the auto-transformer 105. A first of the two secondary windings 104 is connected to a first RF switch 108. A second of the two secondary windings 106 is connected to a second RF switch 110. When the first RF switch 108 is closed, a phase shift of the output signal relative to the input signal is zero degrees. When the second RF switch 110 is closed a phase shift of the output signal relative to the input signal is 180 degrees. Only one switch is closed at a time. The RF switches 108, 110 are connected in series in this embodiment. The series switch is optionally a single pole double throw, SPDT, switch.

The signal path of the RF signal through the auto-transformer phase shifter 100 is the same whether the phase shift is zero degrees or 180 degrees. This ensures that the S parameters (scattering parameters) are consistent.

This phase shifted topology makes it possible to have a passive zero or 180 degrees auto-transformer based phase shifter with close to zero phase to gain variation. This is an advantage over known designs. It also means that for the centre frequency the gain (or insertion loss) of the phase shifter will not change when the phases change from zero to 180 degrees, which is a highly desired feature in phase shifter.

A capacitance of the RF switch 108, 110 interacts with the resonance of the respective winding 102, 104 to which it is connected. The capacitance of the RF switch should be designed to resonate with the inductance as this can result in a performance boost.

The circuit diagram of FIG. 1 provides a way to maintain a similar pathlength (both electrically and in terms of RF parameters) for both the zero degrees and 180 degrees phase shift. The design of the circuit 100 is based on consideration of two independent autotransformers, one being connected in such a way that the output phase is zero degrees in relation to the input signal and the second one connected in such a way that the output phase is 180 degrees shifted in relation to the input signal. This results in a signal path for both the zero degrees and the 180 degrees phase shift being the same. Since the primary windings of both independent auto-transformers have the same electrical connections and each secondary winding shares a common connection (ground), the two independent auto-transformers can be combined into a single auto-transformer with one primary winding and two secondary windings as illustrated.

The phase shifter device 100 has minimal transmission and reflection losses variation between phase shift of zero and 180 degrees. Simulations show that a phase shift of zero and 180 degrees can be achieved. Further, results show that the S parameters of the RF signal through the phase shifting device 100 remain constant. This is advantageous for use in applications.

A metallization process can be used to manufacture the stack-based auto-transformer phase shifter 100 of FIG. 1 according to a number of different designs. During a metallization process, layers of metal are deposited parallel to one another on a prepared surface (e.g. a substrate or chip). The autotransformer 100 comprises manufacturing two windings in parallel metal planes of the metallization process, where the secondary windings 104, 106 are manufactured in a different plane to the primary winding 102. On-chip designs of the phase shifting device 100 which can be manufactured are illustrated in FIGS. 2 to 4.

Figure 2A:
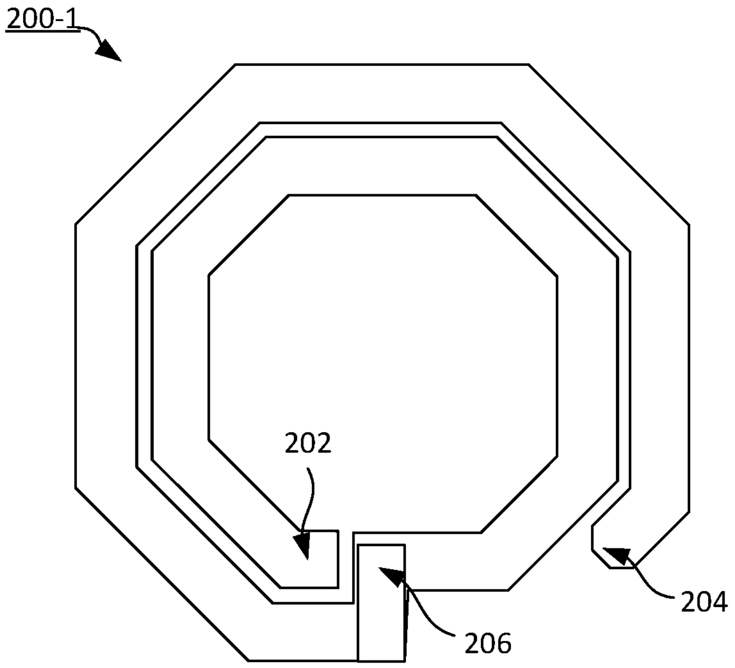
FIG. 2A illustrates a top-down view of a first design of two secondary windings of the auto-transformer according to the first embodiment of FIG. 1.

FIG. 2A illustrates a top-down view of the secondary windings (e.g. secondary coils) 104, 106 of the autotransformer 100 of FIG. 1 as manufactured on a physical substrate using the metallization process described above in accordance with a first on-chip design.

The secondary windings 200-1 comprise two concentric rings in a same plane (i.e. in a same layer of the metallization process). The inner of the two windings comprises an inner ring and has an output port (e.g. a secondary port) 202. The second of the two windings (the outer winding) comprises an outer ring and has a second output port 204. A signal is output through either of the output ports 202, 204 depending on the desired phase shift of the signal relative to the input phase of the signal, which is received at common port 206 from the primary winding 200-2.

A common port 206 is also provided which connects the secondary windings 200-1 of the first metal layer to the primary winding 200-2 of the second, parallel metal layer. The common port 206 comprises a via which electrically connects the common ports of the secondary windings 200-1 and the primary winding 200-2.

Figure 2B:
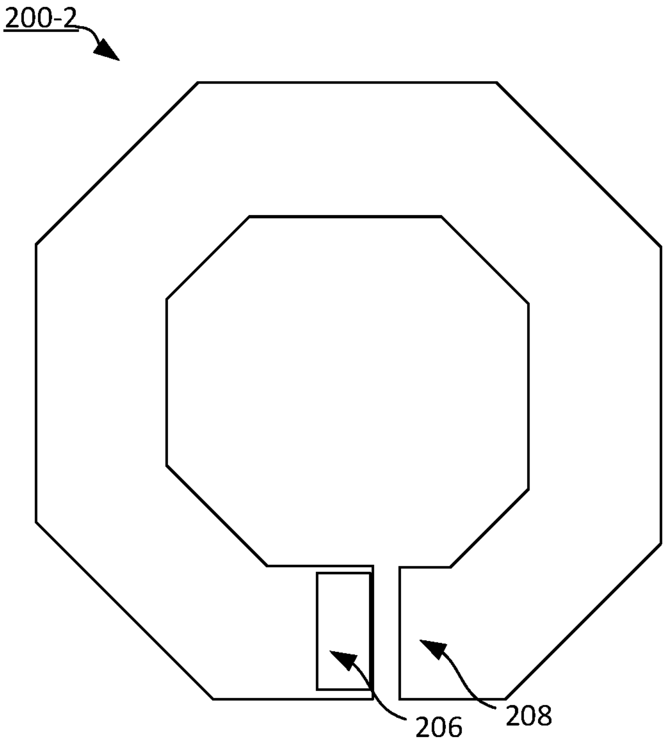
FIG. 2B illustrates a top-down view of the primary winding of the autotransformer of FIG. 1.

FIG. 2B illustrates a top-down view of the primary winding (e.g. primary coil) 102 off the autotransformer 100 of FIG. 1 as manufactured according to a first design, and complementary to FIG. 2A. The primary winding 200-2 comprises a primary port 208 and a common port 206. An input signal (i.e. an RF signal) is received via the primary port 208. The common port is connected to the common port 206 of the secondary windings 200-1 as described above.

Figure 2C:
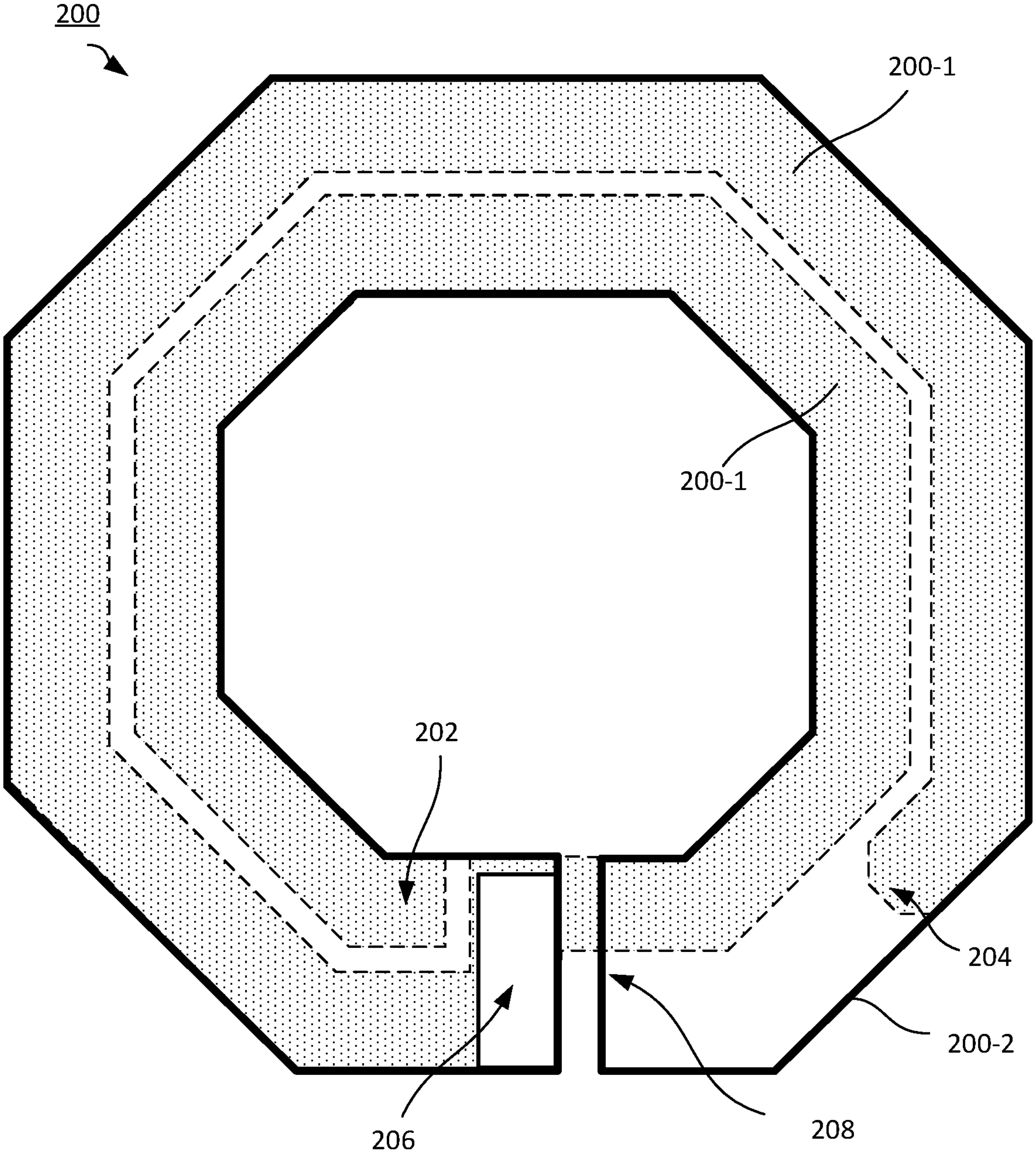
FIG. 2C illustrates a combined top-down view of the auto-transformer comprising the secondary windings and the primary winding of FIGS. 2A and 2B.

FIG. 2C illustrates a combined view of the auto-transformer 200 comprising the secondary windings 200-1 and the primary winding 200-2 of FIGS. 2A and 2B according to the first design.

As illustrated, the primary winding 200-2 is wider than the two individual secondary windings 200-1 and covers the cross-sectional area of the secondary windings 200-1 combined. In FIG. 2C, the primary winding 200-2 is illustrated in a bold line indicating that it is in a plane parallel to the plane in which the secondary windings 200-1 are manufactured.

As can be seen from FIG. 2C the common port 206 is shared between the primary winding 200-2 and the secondary windings 200-1. Input port 208 illustrates where the signal is input to the auto-transformer 200. The signal is output through either one of output ports 202 or 204, depending on a desired phase shift.

Figure 3A:
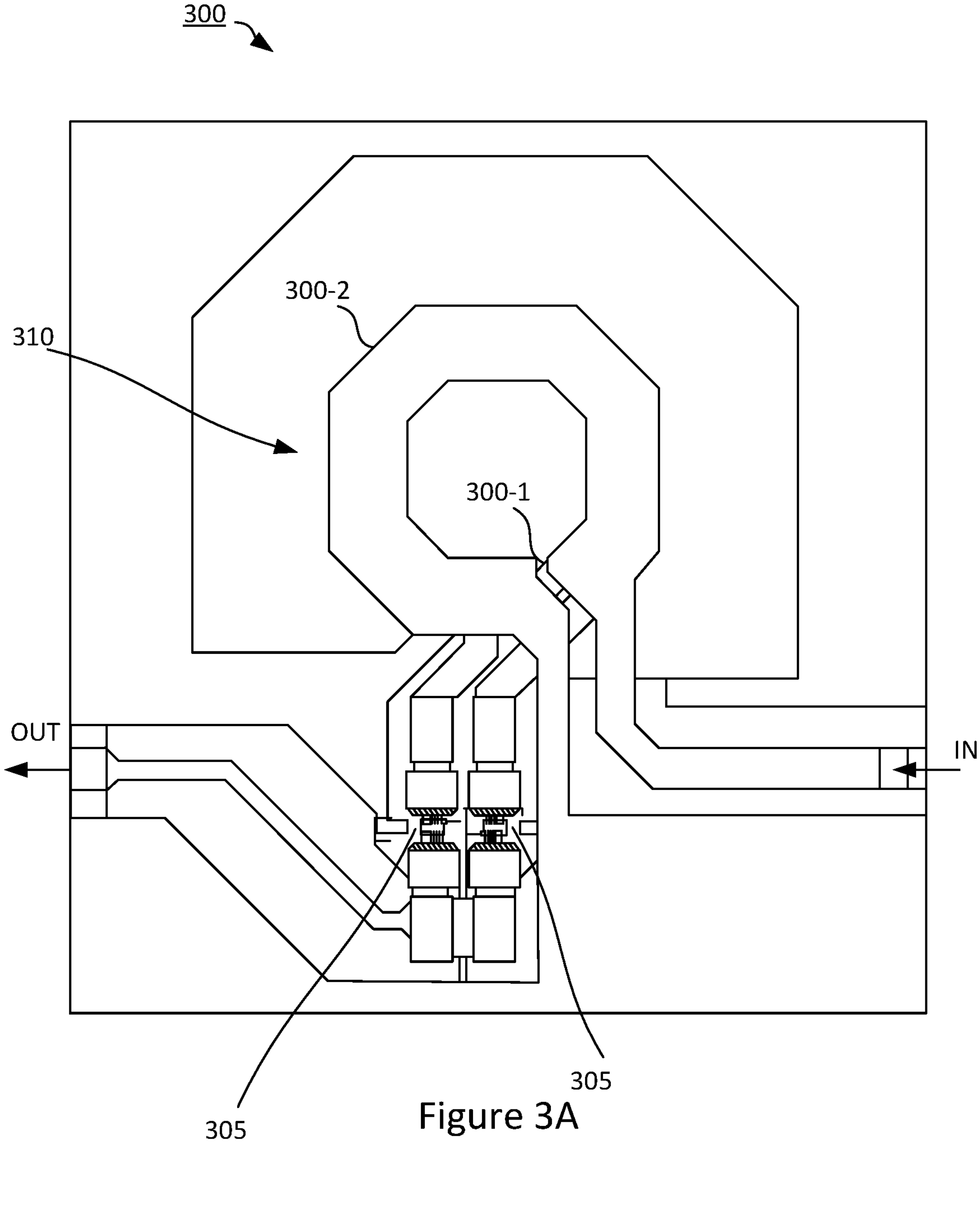
FIGS. 3A to 3C illustrate a second design of the auto-transformer according to the first embodiment of FIG. 1.
Figure 3B:
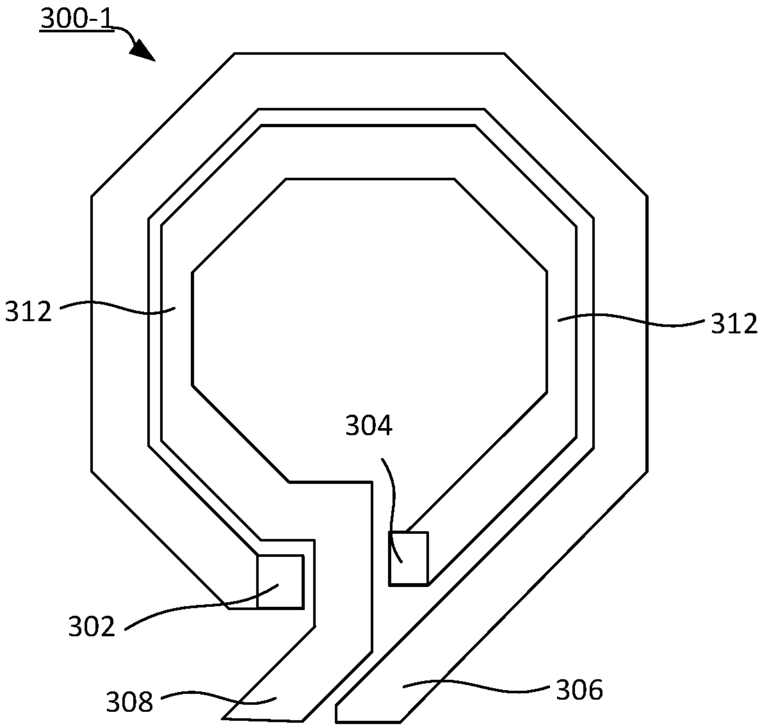
Figure 3C:
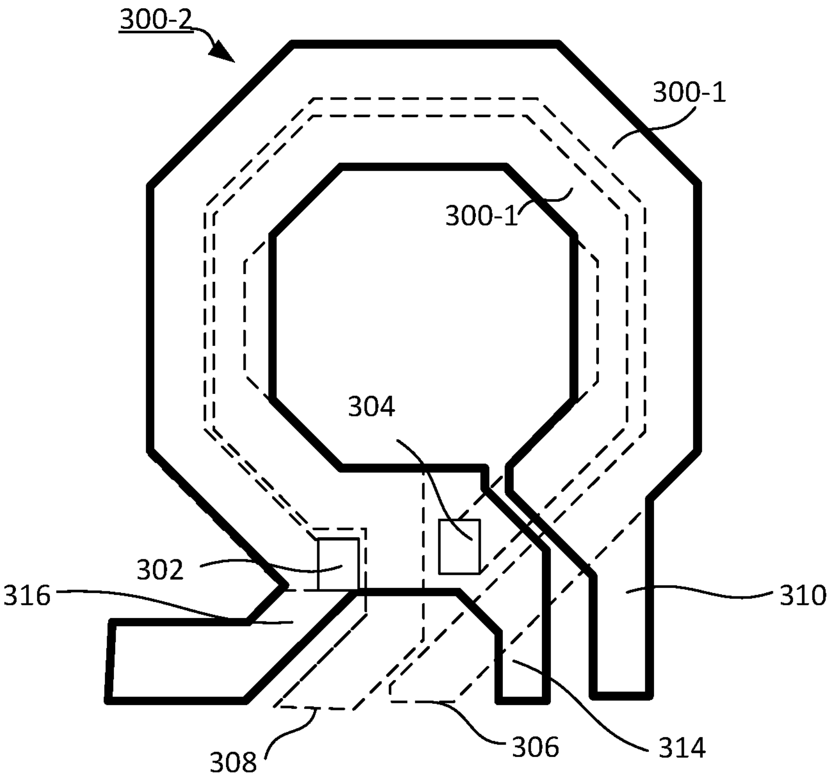

FIGS. 3A to 3C illustrate a second on-chip design of the first embodiment of the present disclosure. FIG. 3A illustrates the phase shifting device on-chip design comprising an autotransformer 310 and RF switches 305. This example on-chip design comprises a similar concentric ring layout as described above in relation to FIG. 2, further comprising switches 305. This second design ensures that the RF switches 305 can be attached successfully.

An input signal is received and traverses through the primary winding 300-2 followed by a secondary winding 300-1 depending on a desired phase shift and a state of the switches 305. The signal that is output from the device 300 has a phase shift of either zero degrees or 180 degrees depending on which of one of these switches 305 is closed.

FIG. 3B illustrates the auto-transformer 310 comprising secondary windings 300-1 of FIG. 3A. FIG. 3C illustrates the auto-transformer 310 comprising the primary windings 300-2 and secondary windings 300-1 of FIG. 3A.

FIG. 3B illustrates the secondary winding 300-1 of the autotransformer 310 or FIG. 3A. The secondary windings 300-1 includes an inner winding 308 and an outer winding 306. The outer winding 306 has a common port 302 which is connected to the primary winding 300-2. The inner winding 308 has a common port 304 which is connected to the primary winding 300-2. Each of the inner and outer windings 306, 308 are connected to respective switches 305.

The inner winding 308 has a shorter length than the outer winding 306. This results in differences of inductance between the outer winding 306 and the inner winding 308 as well as a different coupling factor when the phase shifting device is in use. The inner winding 308 has been designed to have thinner walls 312 than those of the outer winding 306 in order to help compensate for this difference. The thinner walls 312 of the inner winding 308 helps to increase the inductance. Narrowing the walls of the inner winding 308 relative to the outer winding 306 helps to compensate for the difference in inductance between the inner and outer windings 308, 306.

FIG. 3C illustrates the auto-transformer 310 of FIG. 3A. The primary winding 300-2 is illustrated in a bold outline, whilst the secondary windings 300-1 all illustrated in a dashed line.

An input signal is received to the primary winding 300-2 at input port 310. The primary winding 300-2 is connected to the two secondary inner and outer windings 306, 308 by common ports 302 and 304 respectively.

The outputs of the inner and outer windings 306, 308 are connected to switches 305 as illustrated in FIG. 3A.

Figure 4A:
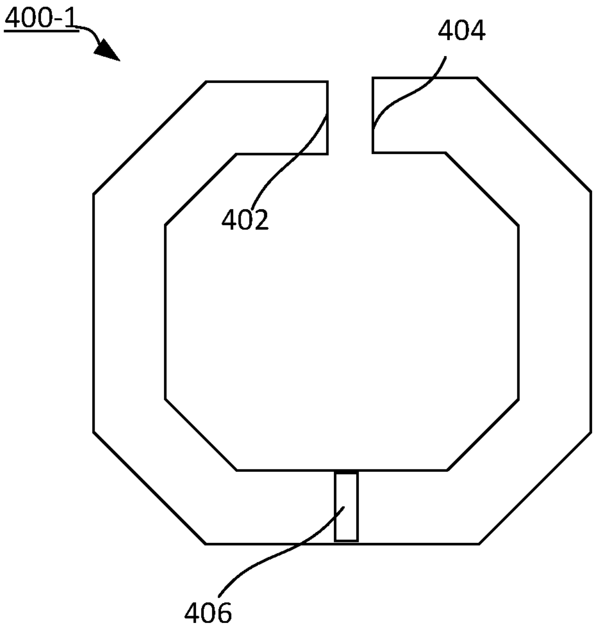
FIGS. 4A and 4B illustrate a third design of the auto-transformer according to the first embodiment of FIG. 1.
Figure 4B:
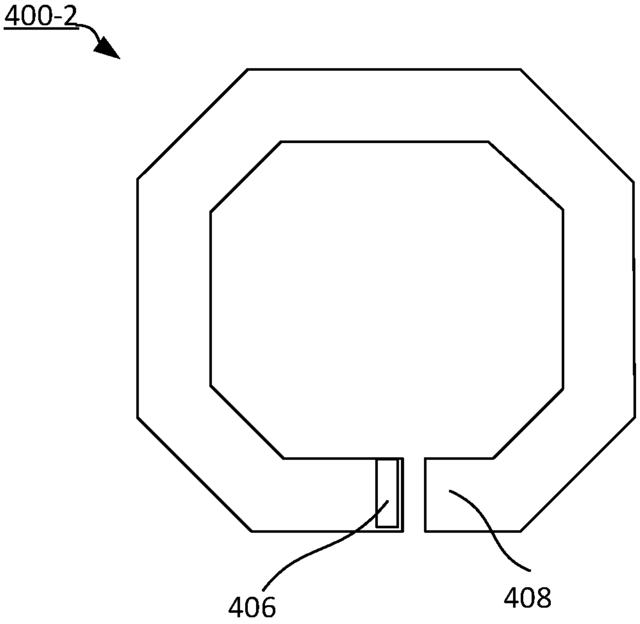

FIGS. 4A and 4B illustrate a third on-chip design for the auto-transformer 105 of FIG. 1.

FIG. 4A illustrates the secondary windings 400-1 having a first output port 402 and a second output port 404 as well as a common node (or common port) 406 which connects the secondary windings to the primary winding. In this design, the secondary windings are not concentric rings as they all in the first two designs described above. Instead, they are designed to be symmetrical in length. They are a mirror-image of each other instead.

FIG. 4B illustrates the primary winding 400-2 comprising input port 408 and common port 406 which connects the primary winding 400-2 to the secondary windings 400-1. Input port 408 receives the input RF signal in use. The primary winding 400-2 has the same area as the secondary windings 400-1 and is manufactured in a parallel plane of the metallization process to the secondary windings 400-1.

The secondary windings illustrated in FIG. 4A are of equal length and are not made from concentric inner and outer rings. This is an alternative arrangement which may be more suitable for higher frequency applications due to the simpler design.

The input port 408 of the primary winding 400-2 is located on the opposite side of the autotransformer to the output ports 402, 404 of the secondary windings 400-1. This ensures that the input signal can be received at one end of the auto-transformer and output at the opposite end. This can be helpful when designing further on-chip devices to be connected to the auto-transformer.

Each of the auto-transformer designs illustrated in FIGS. 2, 3 and 4 could implement the auto-transformer 105 of the first embodiment illustrated in FIG. 1. The layout and shape result from different design decisions to achieve a balanced nature of the device. It will be understood that other configurations may be available, which are not illustrated here or described in detail, but which would nonetheless be covered by the present disclosure.

Only two metal layers of the metallization process are discussed in the present disclosure due to manufacturing constraints. Having only two layers available for manufacturing the phase shifter device 100 comprising the auto-transformer 105 results in the two secondary windings 104, 106 having to be manufactured in the same layer; this introduces design constraints to be overcome. Available processes which allow for use of three metal layers instead of two to manufacture the phase shifters illustrated herein may also be available. In such a scenario, three metal layers each comprising one winding may be used. Such a design although not illustrated here is also covered by the present disclosure.

Figure 5:
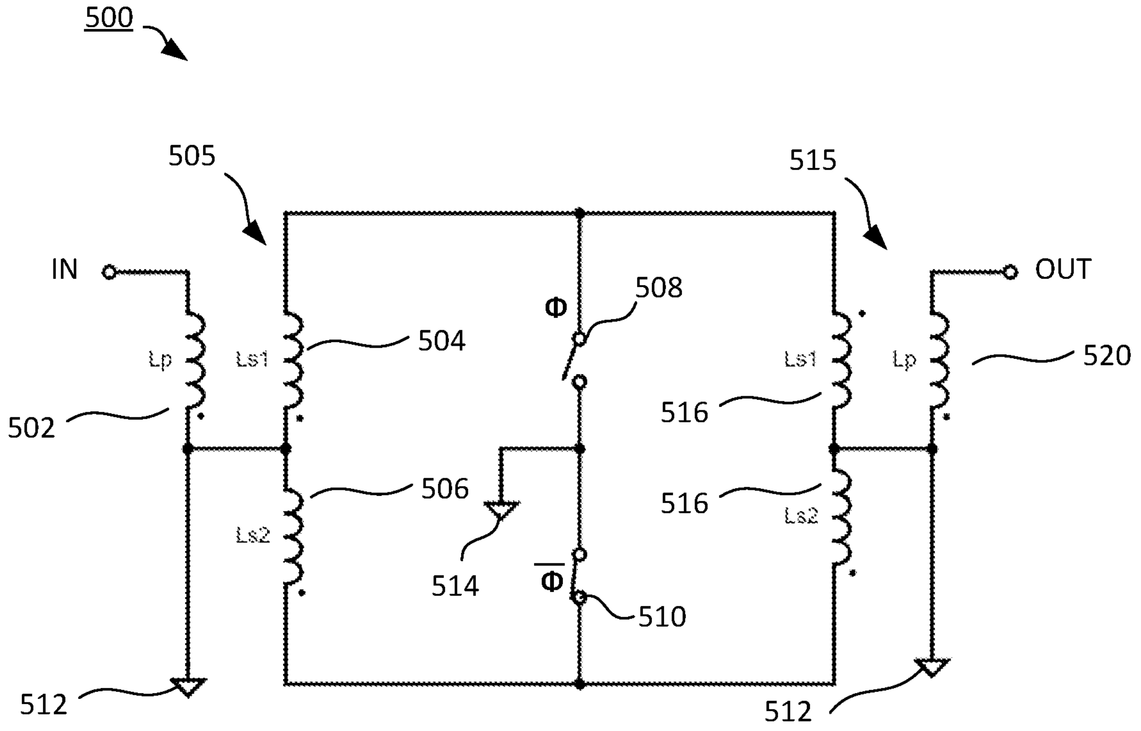
FIG. 5 illustrates a circuit diagram according to a second embodiment of a phase shifter comprising a first auto-transformer and a second autotransformer.

FIG. 5 illustrates a circuit diagram according to a second embodiment of a phase shifter 500 comprising a first auto-transformer 505 and a second autotransformer 515. In this embodiment the second autotransformer 515 makes it possible to derive a second phase shifter device 500 which utilises an RF shunt switch instead of series switches. The switch may be a pin-diode, for example. This can be useful for automotive applications, or applications with higher frequencies more generally.

The first autotransformer 505 is similar to the autotransformer 105 of the first embodiment and comprises a primary winding 502 and two secondary windings 504, 506. An output signal of the first secondary winding 504 is connected to a first RF switch 508 and an output signal of the second secondary winding 506 of the first auto-transformer 305 is connected to a second RF switch 510. The RF switches 508, 510 are connected as a shunt switch which is connected to ground 514.

Similarly to the first embodiment, when the first RF switch 508 is closed, a phase shift of zero degrees of the input signal is achieved and when the second RF switch 510 is closed a phase shift of 180 degrees is achieved.

The second autotransformer 515 comprises two primary windings 516, 518 and a secondary winding 520. The second autotransformer 515 isolates the signal when a shunt switch configuration is used. It sums the two nodes without doing any phase shift of the signal itself; the first auto transformer 505 is still responsible for the phase shifting.

The first primary winding 516 of the second auto-transformer 515 is wound such that an output signal from the first primary winding 516 is in phase with an output signal of the secondary winding 504 of the first auto transformer 505. This ensures that the signal is not phase shifted. An output signal of the second primary winding 518 of the second autotransformer 515 is in phase with the output signal of the secondary winding 506 of the first auto-transformer 505. An output signal from the secondary winding 520 of the second autotransformer 515 is in phase with an input signal of either of the first and second primary windings 516, 518 of the second autotransformer 515.

By adding a second auto-transformer 515 when a shunt-switch configuration is used, the signal is balanced. The signal is phase shifted by the first auto-transformer 505 but not by the second auto-transformer 515. The phase shift of the input signal as achieved by the first auto-transformer 505 is maintained through the second auto-transformer 515 such that the output signal has the chosen phase shift.

Only one of the switches 508, 510 are closed at a time to ensure that the signal is phase shifted as desired.

Figure 6:
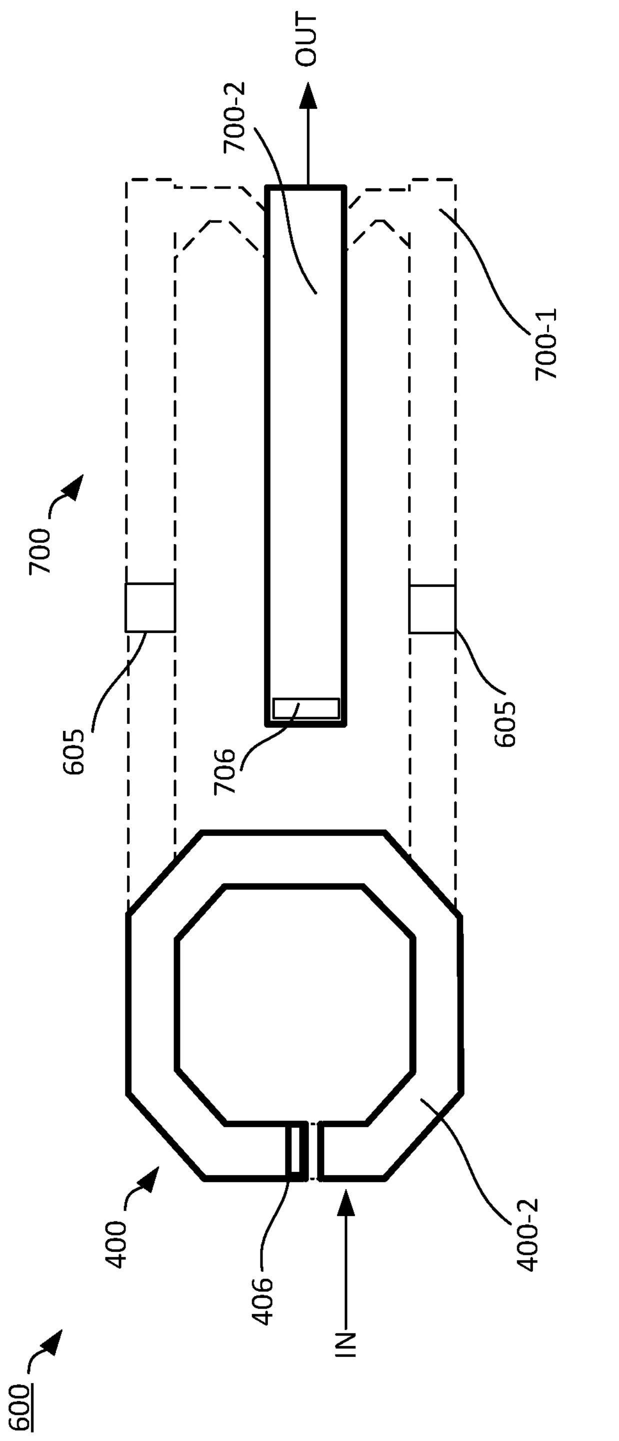
FIG. 6 illustrates a top-down view of an on-chip phase shifter according to the second embodiment as illustrated in FIG. 5.

FIG. 6 illustrates a top-down view of an on-chip phase shifter according to the second embodiment as illustrated in FIG. 5.

The first autotransformer 400 is of the design illustrated in FIGS. 4A and 4B and is connected to the second autotransformer 700 by first and second switches which can be connected to the transformer at a location 605 between the first and second autotransformers 400, 700, for example by a conductive via.

The RF input signal and output signal through the on-chip design of the auto-transformer 600 according to the second embodiment is illustrated in FIG. 6. Common node 406 connects the primary winding and the two secondary windings of the first autotransformer 400. Common node 706 connects the two primary windings and the secondary winding of this second autotransformer 700.

As can be seen, the first and second auto-transformers 400, 700 are arranged adjacent one another and connected such as to form a single structure. Switches 605 are connected to the auto-transformers 400, 700 to control signal flow.

The primary winding 400-2 of the first auto-transformer 400 and the secondary winding 700-2 of the second auto-transformer 700 are manufactured in the same layer (e.g. a first layer) as each other, whilst the two secondary windings 400-1 of the first autotransformer 400 and the two primary windings 700-1 of the second autotransformer 700 are manufactured in the same layer (e.g. a second layer) as each other in the metallization process. The switches 605 may be manufactured in a different layer to the auto-transformers 400, 700. In some examples, the switches may be made from a different material to the autotransformers 400, 700. The switches are in electrical connection with the autotransformers 400, 700.

Figure 7A:
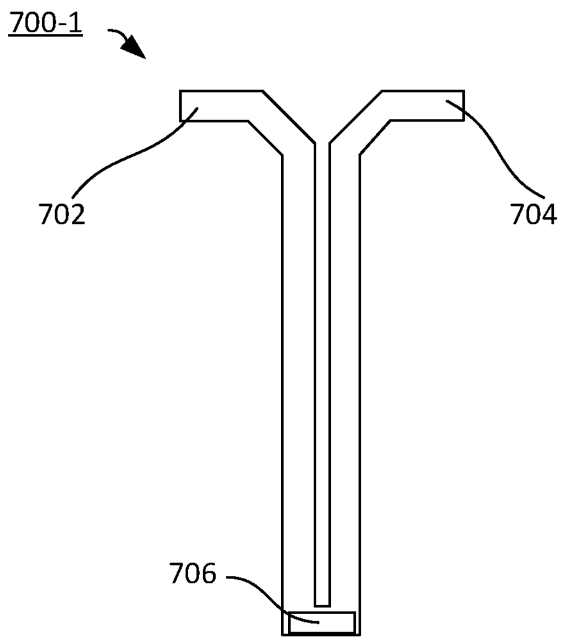
FIGS. 7A and 7B illustrate top-down views of the second autotransformer of the second embodiment of FIG. 5.
Figure 7B:
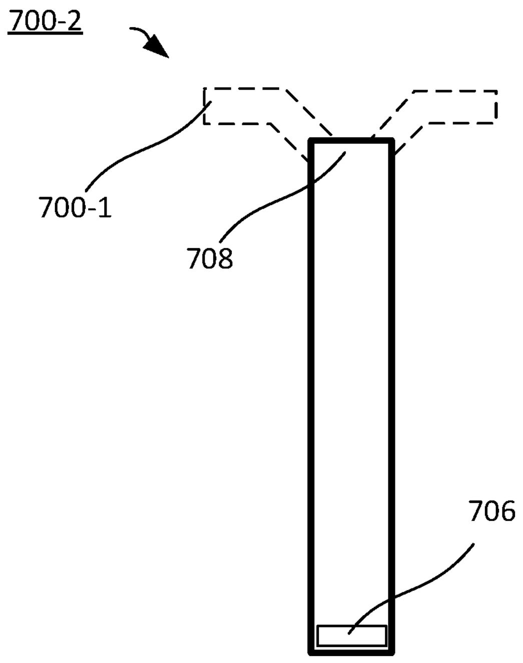

FIGS. 7A and 7B illustrate top-down views of the second autotransformer 700 of FIG. 5. FIG. 7A illustrates the two primary windings 700-1 comprising input ports 702, 704. Common port 706 connects to the secondary winding 700-2 as illustrated in FIG. 7B. The design of the second auto-transformer is linear (and not curved) and acts to sum the two nodes without creating a phase shift.

The two primary windings 702, 704 have the same cross-sectional area and are a mirror-image of one another.

The same advantages of same path length for signal passing through the phase shifting device 600 have been shown for the second embodiment as the first. This is largely due to the first auto-transformer 505 being the same as the autotransformer 105 of the first embodiment.

The autotransformer phase shifter 100, 500 according to the present disclosure can be used, for example, in beam forming applications. An RF beam is created to perform beam steering. Instead of just irradiating the power of the RF beam, a beam direction can also be achieved by focusing the beam. Phase shifting is integral to achieving beam steering.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

The invention claimed is:

1. A phase shifting device with a device input and a device output, the phase shifting device comprising:

a first auto-transformer that includes a first primary winding coupled to the device input and configured to receive an input signal at a first input and to produce a first output signal at a first output, a first secondary winding with a second input coupled to the first output, wherein the first secondary winding is wound such that a second output signal at a second output of the first secondary winding is in phase with the input signal at the first input of the first primary winding, and a second secondary winding with a third input coupled to the first output, wherein the second secondary winding is wound such that a third output signal at a third output of the second secondary winding is out of phase with the input signal at the first input of the first primary winding;

a first switch coupled between the second output of the first secondary winding and the device output, wherein the device output is configured to receive the second output signal produced at the second output of the first secondary winding when the first switch is closed; and a second switch coupled between the third output of the second secondary winding and the device output, wherein the device output is configured to receive the third output signal produced at the third output of the second secondary winding when the first switch is closed.

2. The device of claim 1, wherein a first path length of a first signal received at the first input of the first primary winding and output via the second output of the first secondary winding is equal to a second path length of a second signal received at the first input of the first primary winding and output via the third output of the second secondary winding.

3. The device of claim 1, wherein:

the phase shifting device is configured so that only one of the first switch and the second switch is closed at a given time;

when the first switch is closed and the second switch is open, a phase shift of the second output signal to the input signal is zero degrees; and when the second switch is closed and the first switch is open, the phase shift of the third output signal to the input signal is 180 degrees.

4. The device of claim 1, wherein:

the first switch is coupled in series between the second output of the first secondary winding and the device output; and the second switch is coupled in series between the third output of the second secondary winding and the device output.

5. The device of claim 1, wherein the first output of the first primary winding is coupled to ground.

6. A phase shifting device with a device input and a device output, the phase shifting device comprising:

a first auto-transformer that includes a first primary winding coupled to the device input and configured to receive an input signal at a first input and to produce a first output signal at a first output, a first secondary winding with a second input coupled to the first output, wherein the first secondary winding is wound such that a second output signal at a second output of the first secondary winding is in phase with the input signal at the first input of the first primary winding, and a second secondary winding with a third input coupled to the first output, wherein the second secondary winding is wound such that a third output signal at a third output of the second secondary winding is out of phase with the input signal at the first input of the first primary winding;

a second auto-transformer coupled to the second and third outputs of the first and second secondary windings of the first auto-transformer, and coupled to the device output of the phase shifting device;

a first switch coupled between the second output of the first secondary winding and a ground, wherein the first switch is configured to shunt the second output signal produced at the second output of the first secondary winding to the ground when the first switch is closed; and a second switch coupled between the third output of the second secondary winding and the ground, wherein the second switch is configured to shunt the third output signal produced at the third output of the second secondary winding to the ground when the second switch is closed.

7. The device of claim 6, wherein the second auto-transformer comprises:

a second primary winding with a fourth input coupled to the second output of the first secondary winding;

a third primary winding with a fifth input coupled to the third output of the second secondary winding; and a third secondary winding coupled between fourth and fifth outputs of the second and third primary windings and the device output of the phase shifting device.

8. The device of claim 6, wherein:

the phase shifting device is configured so that only one of the first switch and the second switch is closed at a given time;

when the first switch is closed and the second switch is open, a phase shift of the second output signal to the input signal is zero degrees; and when the second switch is closed and the first switch is open, the phase shift of the third output signal to the input signal is 180 degrees.

9. The device of claim 6, wherein the third secondary winding of the second auto-transformer is wound such that an output signal of the third secondary winding is in phase with an input signal of either one of the second and third primary windings of the second auto-transformer.

10. The device of claim 6, wherein the first output of the first primary winding is coupled to ground.

11. A method of manufacturing a phase shifting device with a device input and a device output, the method comprising:

depositing a primary winding in a first metal layer, the primary winding having a first input and a first output;

depositing a first secondary winding in a second metal layer that is parallel to the first metal layer, wherein the first secondary winding has a second input coupled to the first output, and the first secondary winding is wound such that a second output signal at a second output of the first secondary winding is in phase with the input signal at the first input of the first primary winding;

depositing a second secondary winding in the second metal layer, wherein the first secondary winding has a third input coupled to the first output, and the second secondary winding is wound such that an output signal at a third output of the second secondary winding is out of phase with the input signal of the primary winding;

coupling a first switch to the second output of the first secondary winding; and coupling a second switch to the third output of the second secondary winding.

12. The method of claim 11, wherein:

coupling the first switch includes coupling the first switch between the second output of the first secondary winding and the device output; and coupling the second switch includes coupling the second switch between the third output of the second secondary winding and the device output.

13. The method of claim 11, further comprising:

coupling a second auto-transformer between the device output and the second and third outputs of the first and second secondary windings of the first auto-transformer.

14. The method of claim 13, wherein:

coupling the first switch includes coupling the first switch between the second output of the first secondary winding and a ground; and coupling the second switch includes coupling the second switch between the third output of the second secondary winding and the ground.

15. The method of claim 11, wherein the primary winding, the first secondary winding, and the second secondary winding are each configured as a ring.

16. The method of claim 15, wherein the second secondary winding is positioned within the first secondary winding.

17. The method of claim 15, wherein the second secondary winding has narrower walls than the first secondary winding.

18. The method of claim 15, wherein the first secondary winding is positioned opposite the second secondary winding.

19. The method of claim 11, wherein the first and second secondary windings have a same path length.

* * * * *